United States Patent [19]

Mugford et al.

[11] Patent Number: 4,630,178
[45] Date of Patent: Dec. 16, 1986

[54] ARTICULATED COUPLING ASSEMBLY FOR VEHICLE HEADLAMP DOORS

[75] Inventors: Donald A. Mugford, East Detroit; Daniel D. Vivian, Bloomfield Hills, both of Mich.

[73] Assignee: Chrysler Motors Corporation, Highland Park, Mich.

[21] Appl. No.: 808,771

[22] Filed: Dec. 13, 1985

[51] Int. Cl.$^4$ .................. B60Q 1/00; B60Q 11/00
[52] U.S. Cl. .................................................. 362/64
[58] Field of Search ................................. 362/61, 64

[56] References Cited

U.S. PATENT DOCUMENTS 3,504,168  3/1970  Johnson et al. .................. 362/64
3,601,594  8/1971  Carbary ........................... 362/64

Primary Examiner—Lloyd L. King
Attorney, Agent, or Firm—Edward P. Barthel

[57] ABSTRACT

An improved articulated coupling assembly which connects the ends of a motor driven torsion bar to a pair of headlamp concealment door crank arm pivot pins. A plastic spool member, having a square sectioned passage terminated in an outboard socket, is telescopically mounted at each end of the torsion bar. Each crank arm pivot pin has a ball portion formed on its inboard end for reception in its associated spool socket. A spring wire clip, removably snapped on the spool member, has a cross pin portion received in aligned apertures in the spool socket and a registering diametrical slot in the ball portion. The coupling provides limited axial and universal movement of the spool member during opening and closing of the doors. Removal of the spring wire clip allows the spool member to slide inboard on the bar freeing its crank arm pivot pin for ready removal.

4 Claims, 8 Drawing Figures

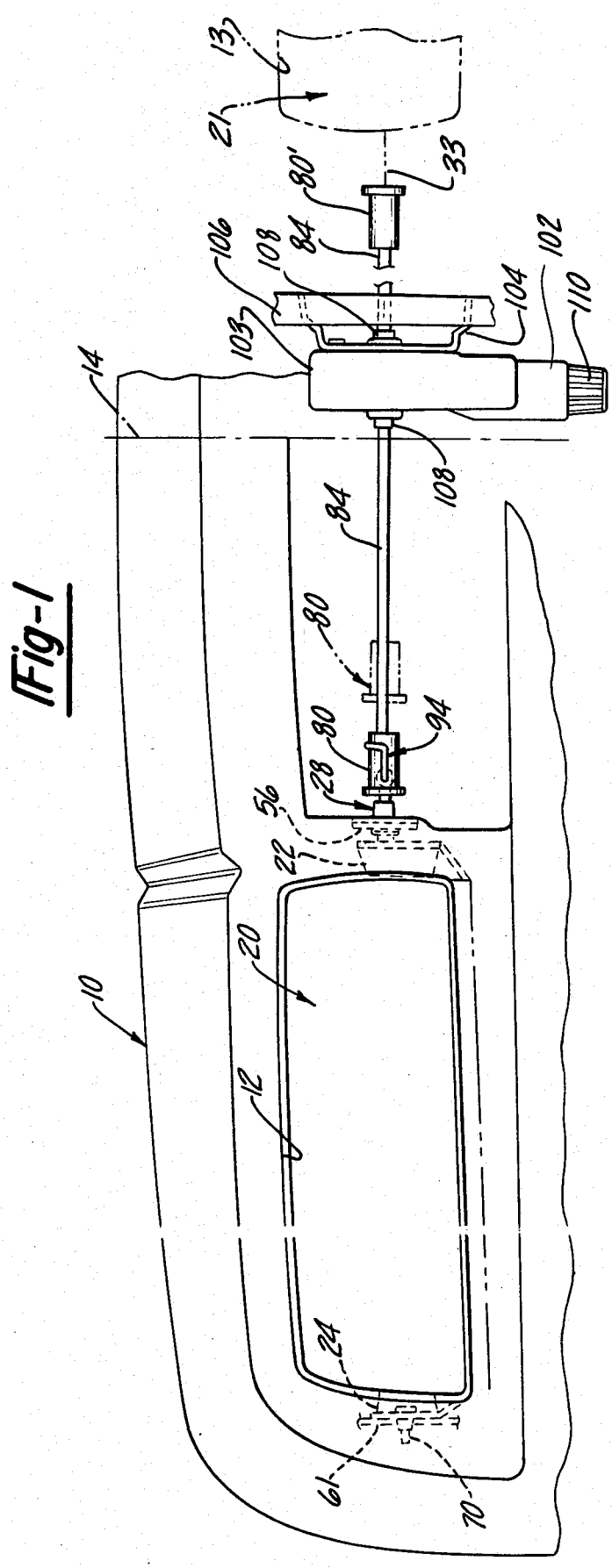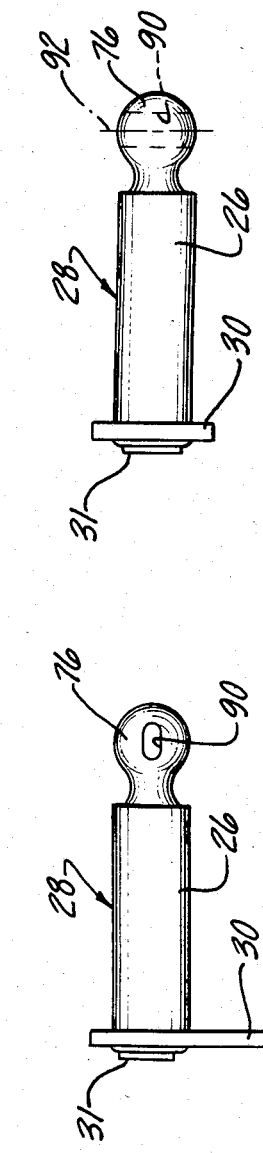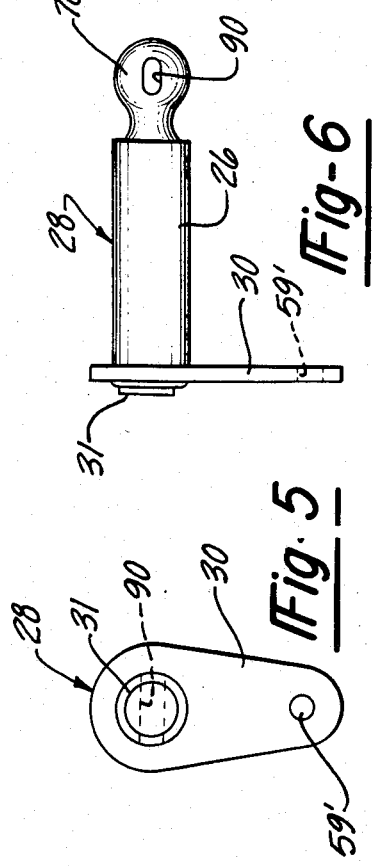

ARTICULATED COUPLING ASSEMBLY FOR VEHICLE HEADLAMP DOORS

This invention relates to headlamp concealment doors for vehicles and more particularly to a articulated coupling assembly for ready installation and removal of pivotal headlamp doors.

BACKGROUND OF THE INVENTION

Headlamp concealment doors for motor vehicles which are actuated by a single electric motor are known in the prior art. An example of such arrangement is shown in U.S. Pat. No. 3,601,594 issued Aug. 24, 1971 to L. A. Carbary. The Carbary patent shows a pair of rotatable headlamp doors which are opened and closed by a single motor driving a transverse torsion bar. Each door includes an inboard arm fastened to a slotted crank arm element including a pivot pin rotatably supported by a headlamp housing. The Carbary crank arm element is detachably coupled by a retainer clip to one end of the torsion bar.

SUMMARY OF THE INVENTION

It is accordingly an object of the present invention to provide a simplified detachable coupling assembly which allows the headlamp doors to be readily installed and removed for servicing. It is a further object of the invention to provide a low cost coupling assembly which allows the transmission of torque from a single motor driven torsion bar to a pair of headlamp door crank arm hinge pins while permitting limited angular articulation between the axis of the rotating torsion bar and the pivotal axis of the hinge pins. Thus, the joint angle between the pivot pin and torque bar may vary over a limited range during movement of the doors without interfering with their operation.

The present invention relates to an articulated detachable arrangement for coupling a transverse torsion bar to a pair of laterally spaced headlamp concealment doors. Each door has a crank arm element, including a pivot pin, fixed to its inboard support arm. A plastic spool has an polygonal-sectioned axial passage terminating at its outboard end in a cylindrical blind counter bore socket. Each spool axial bore is sized for slidable non-rotatable reception on one end of the torsion bar. Each pivot pin has a ball portion on its inboard end adapted for snug reception in an associated spool socket. A cross pin portion of a spring wire clip extends through aligned holes in each spool socket and registers with a diametrical slot formed in its associated ball portion. The arrangement allows articulated limited universal movement between the respective ball portions and their associated spools while transmitting motor drive torque from the bar to each crank arm for opening and closing the headlamp concealment doors. Upon removal of the spring wire clip each spool is free to slide inwardly on the torque bar releasing its pivot pin ball portion. As a result each crank arm may be detached and its associated headlamp door serviced upon removal of its outboard pivot bolt.

BRIEF DESCRIPTION OF THE DRAWINGS

The objects, features and advantages of the present invention are readily apparent from the following detailed description of the best mode taken in conjunction with the accompanying drawings in which:

FIG. 1 is a fragmentary front elevational view with parts broken away of a motor vehicle passenger side front-end equipped with a headlamp door shown in its closed or headlamp concealing position;

FIGS. 5, 6 and 7 are enlarged detail views of the crank arm the assembly, and

DESCRIPTION OF THE PREFERRED EMBODIMENT

Figure 2:
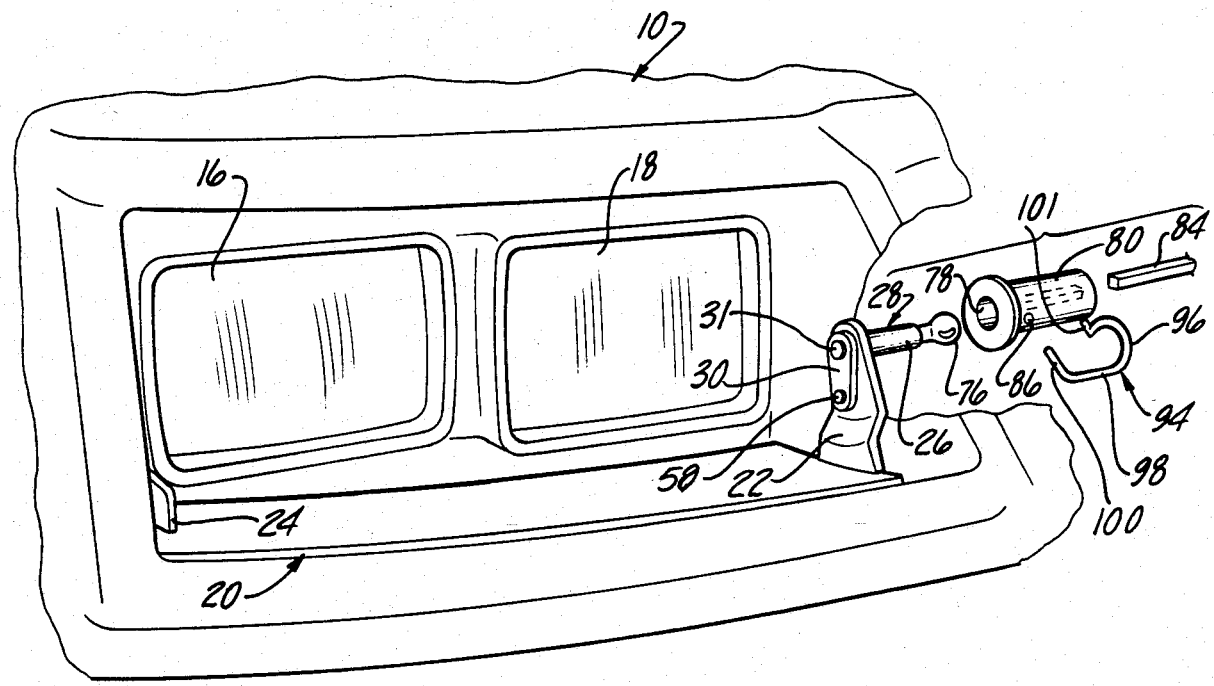
FIG. 2 is a perspective view with parts broken away of the motor vehicle passenger side front-end with the headlamp door shown in its open or headlamp revealing position.

Referring now to the drawings and more particularly to FIGS. 1 and 2 thereof, a left hand front portion of an automotive vehicle is shown as viewed from the front of the vehicle. The vehicle has a sheet metal body 10, the forward end of which is provided with a substantially rectangular left hand opening 12. An identical mirror-image right hand opening, indicated in dashed lines at 13 in FIG. 1, is provided on the right hand front portion of the body. As the body is symmetrical about its longitudinal axis, only the left hand portion shown in FIGS. 1 and 2 will be described in detail. It is understood that the pair of openings 12 and 13 are symmetrically spaced on opposite sides of the vehicle centerline indicated at 14 in FIG. 1. Disposed rearwardly of the opening 12 are a pair of outboard and inboard headlamp assemblies 16 and 18 respectively, shown exposed in FIG. 2 to project beams of light forwardly of the body. The headlamps 16 and 18 are fixedly secured by bezels to a body mounting support or plate (not shown).

A left hand door assembly or closure is shown at 20 in FIG. 1 with its mirror image companion right hand door assembly partially indicated in dashed lines at 21. The headlamp door assembly 20 is swingably mounted on the body 10 by inboard 22 and outboard 24 parallelly disposed, rearwardly extending arms for movement between open (FIG. 2) and closed (FIG. 1) positions with respect to the opening 12. With reference to the exploded view of FIG. 8, inboard arm 22 is secured adjacent the right hand edge of the door assembly 20 for pivotal movement about transverse hinge pin 26 of a crank arm generally indicated at 28.

As best seen in FIGS. 5, 6 and 7, the crank arm 28 includes a mounting arm plate portion 30 oriented normally on the outboard end of the hinge pin 26. That is, the arm portion 30 extends longitudinally relative to the transverse axis of the hinge pin 26. The mounting arm portion 30 is suitably fixed to the outboard end of the pin 26 such as by the heat upsetting of a head portion 31 upon its being projected through a conforming hole in the arm portion.

Figure 3:
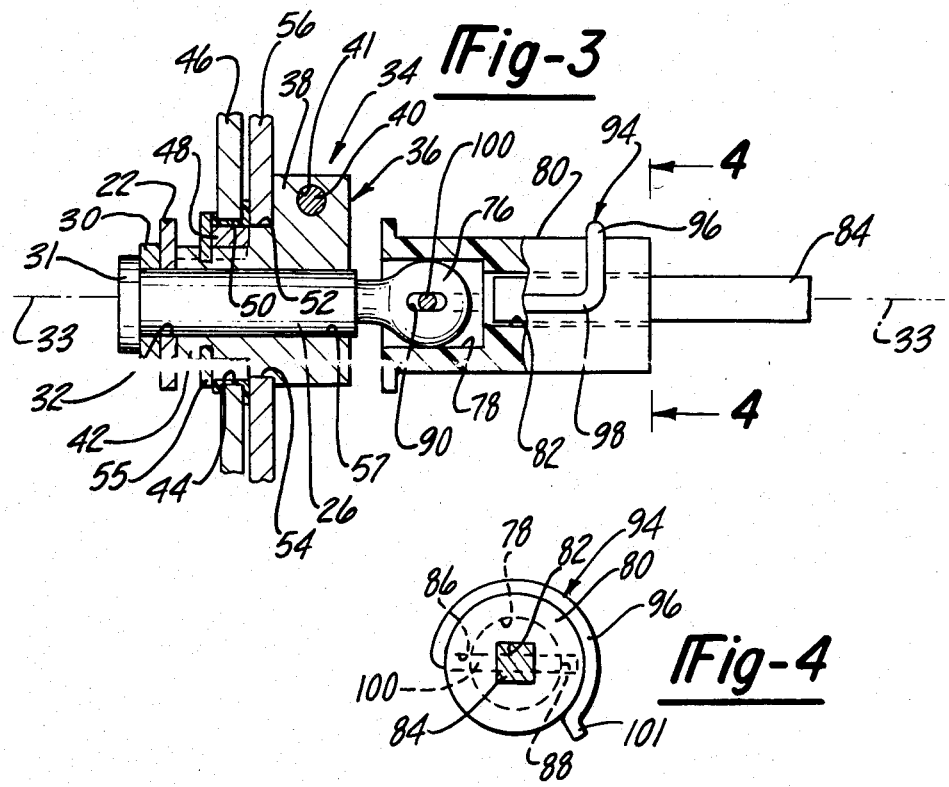
FIG. 3 is an enlarged vertical fragmentary cross sectional view with parts in elevation of the coupling assembly of the present invention.
Figure 8:
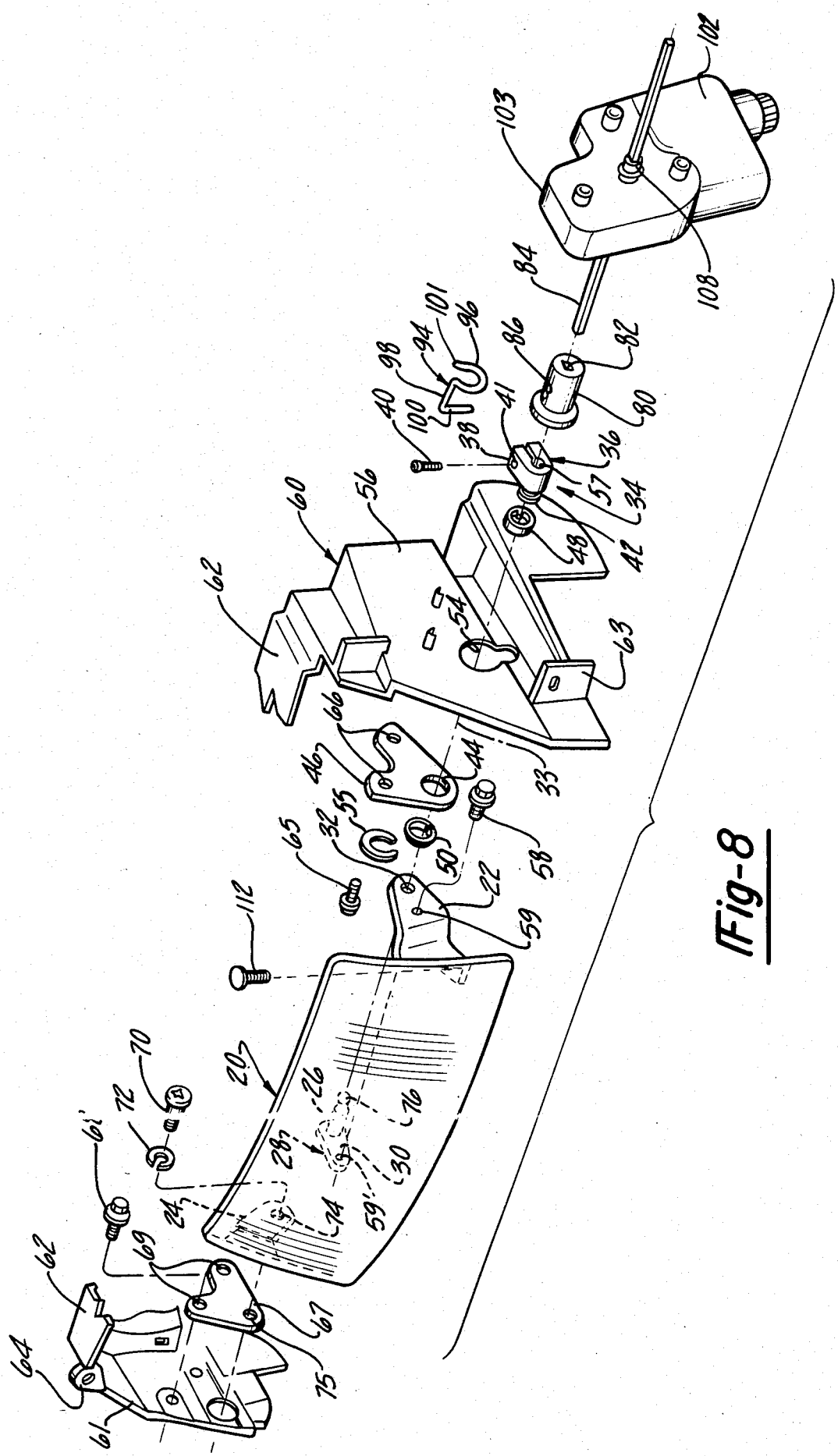
FIG. 8 is an exploded view of the passenger side headlamp door together with its coupling assembly and drive motor.

The crank-arm hinge pin 26 extends through an opening 32 in the inboard arm 22 aligned on door pivotal transverse axis 33. As seen in FIGS. 3 and 8, the hinge pin 26 is fixedly supported in a bushing assembly, generally indicated at 34. The bushing assembly includes a split bushing 36 having bifurcated body portion 38 joined by a clamping bolt 40 threadably received in aligned bores 41. The split bushing 36 has a hub portion 42 positioned concentrically in circular opening 44 of inboard support bracket 46 by an anti-rotation collar 48. A plastic split ring 50, located on the collar 48, provides a journal bearing pivotally supporting the bushing assembly 34 in the bracket opening 44 for rotation about the axis 33.

As seen in FIG. 3, the bushing hub 42 has a stepped shoulder 52 which is concentrically received in circular opening 54 of a door housing inboard leg portion 56. Snap ring 55 axially retains the bushing assembly 34 in the openings 44 and 54 of members 46 and 56, respectively. Thus, upon the hinge pin 26 being inserted in the bushing bore 57 and the clamping bolt 40 tightened, the crank arm is ready for attachment to the inboard door casing 22 by threaded bolt 58 being inserted in inboard arm bore 59 and crank arm plate portion bore 59'.

The door housing, generally indicated at 60 in FIG. 8, is an inverted U-shaped plastic member having an outboard leg portion 61 joined to the inboard leg portion 56 by an upper bridge member 62. Securing tab 63 on leg portion 56 and 64 on leg portion 61 are provided to fixedly mount the housing 60 in vehicle body opening 12 by suitable fasteners (not shown). The inboard bracket 46 is mounted on the housing inboard leg portion 56 by threaded bolts 65 extending through holes 66. An outboard bracket 67 is similarly mounted on the housing outboard leg portion 61 by threaded bolts 68 positioned through holes 69. An outboard pivot bolt 70 is journally supported by split plastic ring 72 in door outboard arm opening 74, an outboard bracket opening 75 aligned on the pivot axis 33.

As best seen in FIGS. 3, 6 and 7 the crank arm hinge pin 26 has an integral spherical shaped ball portion 76 formed on its inboard free end. The ball portion 76 is sized for nested relative pivotal reception in axial cylindrical blind bore socket 78 formed in the outboard end of a cylindrical cross sectioned spool 80 molded of suitable plastic material. A polygonal cross sectioned axial through passage 82, coaxial with the blind bore socket 78, is adapted to telescopically receive in its inboard end one end of a transversely extending torsion bar 84. The bar 84 has a polygonal cross-section complementary to the through passage 82. In the disclosed embodiment the torsion bar 80 and spool passage 82 have complementary square cross sections providing driving interconnection between the torsion bar and the spool.

Figure 4:
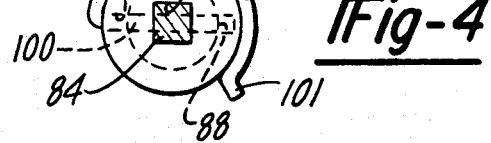
FIG. 4 is a vertical cross-sectional view taken on the line 4—4 of FIG. 3.

With reference to FIG. 4, it will be seen that the spool 80 has a pair of diametrically opposed apertures 86 and 88 formed in the blind bore socket 78 aligned on a cross axis which intersects the principal axis of the spool at a right angle. The ball portion 76 has a transversely extending slot 90 extending therethrough formed with its principal axis coincident with the ball portion diametrical slot 92 (FIG. 7) and adapted to intersect the principal axis of the pivot pin 26.

A detachable spring wire clip or fastener retaining device is shown generally at 94 in FIGS. 2, 3 and 4. The device comprises a continuous spring wire member bent to form a semi-circular loop 96 at one end resiliently biased into tight engagement with the spool. A linear portion 98 extends axially from one end of the loop. The linear portion 98 is oriented normal to the transverse plane of the loop 96 then turns inwardly at right angles forming a diametrically disposed cross pin portion 100. The cross pin portion 100 extends through the aligned apertures 86 and 88 an the registering slot 90 retaining the ball portion 76 in the spool socket 78. The semi-circular loop 96 other end terminates in a radially outward finger portion 101 enabling the clip to be readily detached from the spool by releasing the inward bias of the loop 96.

The cross pin portion 100 allows for limited angular movement of the spool about the ball portion 76 in a first diametrical plane of the ball portion oriented normal to the slot axis 92. By virtue of the ball portion slot 90 the spool is also free for limited articulated or angular movement in a second diametrical plane of the ball portion that includes the slot axis 92. Thus, the spool socket 78, pivot pin ball portion 76, and the spring wire clip 94 provide a detachable articulated coupling for the universal transmission of angular drive torque from the bar 84 to the crank-arm pivot pin 26. The coupling compensates for limited angular misalignment between the axis of the pivot pin 26 and the torsion bar axis during opening and closing of the concealment doors.

As seen in FIGS. 1 and 8, a reversible electric drive motor 102 is supported intermediate the left and right hand openings 12 and 13 by a suitable bracket 104 fixed to the body portion 106. The drive motor includes a gear box 103 through which a tubular output sleeve 108 extends from opposite sides of its housing. The sleeve principal axis is aligned on the door assemblies pivotal axis 33. The output sleeve 108 has a square cross-sectioned axial bore complementary with the square cross sectioned torsion bar 84.

The torsion bar 84 is shown extending through the drive sleeve 108 with its left and right ends slidably received in the axial bore 82 of its associated left and right spools 80 and 80'. The spool 80' is identical to the spool 80 and is oriented in a mirror image manner to spool 80 for operation of the right door assembly 21. The drive motor 102 has a hand control knob 110 which allows for manual rotation of the output sleeve 108 to adjust the doors to a predetermined halfway open position for headlamp door removal or installation.

In operation, when the motor 102 is energized it drives the output sleeve 108 which in turn rotates the torsion bar 84 in a counterclockwise direction assuming the door assemblies 20 and 21 are in their first closed position shown in FIG. 1. The bar 84 simultaneously rotates the spools 80 and 80' and their associated crank arms 28 pivoting both door assemblies 20 and 21 downwardly to a second open position. In the open position, illustrated in FIG. 2, both left and right pairs of headlamps 16 and 18 are exposed allowing the headlamps to project beams of light forwardly of the vehicle body 10.

In the case of the left door assembly 20 rotation of the spool 80 causes the cross pin 100 to in turn rotate pivot pin 26 counterclockwise pivoting its crank arm mounting plate 30 and its associated door inboard supporting arm 22 about the axis 33 to the FIG. 2 open position. In a conventional manner, when the door assemblies reach their fully open position a limit switch (not shown) deenergizes the motor 102 so that further rotation of the torsion bar 84 is discontinued. It will be noted that down stop bumper means in the form of bolt 112 is provided to exactly position the door assembly 20 in its open position. When the electric motor 102 is subsequently energized the torsion bar 84 is driven in a clockwise direction to return the door assemblies 20 and 21 to their first closed position wherein a second motor limit switch (not shown) again deenergizes the electric motor 102.

It will be appreciated that applicant's unique detachable spring wire clip 94 spool 80 and crank arm 28 coupling assemblies allow for ready headlamp door installation and removal. Thus, by merely removing the spring wire clip 94 the spool 80 is free to be slid inwardly on the bar 84 to its dashed-line position shown in FIG. 1. In this way the pivot pin 26 may be slid outwardly upon the removal of the bolt 58 holding the crank arm plate portion 30 to the door arm 22 at the inboard side of the door. This procedure is merely reversed to readily install the door coupling assembly.

Although only one embodiment of the invention has been disclosed and described, it is apparent that other embodiments and modifications are possible.

What is claimed is:

1. In combination with a vehicle having a body, a pair of right and left openings formed in the forward end of said body on opposite sides of the longitudinal axis of said body, a headlamp assembly including a housing fixedly located in each of the openings, a closure for each opening, each said closure supported by inboard and outboard pivot means for pivotal movement about a transverse axis and arranged to pivot from a first position wherein said closure conceals its associated opening to a second position wherein each said headlamp assembly is exposed to project one or more beams of light forwardly of said body, a polygonal cross section torsion bar aligned on said transverse axis and extending between said right and left openings, motor means operative to rotate said torsion bar, each said inboard pivot means in the form of a pivot pin extending inboard from its associated closure, journal means in the housing pivotally supporting said pivot pin for rotation about said transverse axis, fastener means on the outboard end of each said pivot pin for removably connecting said pivot pin to its associated housing, the improvement comprising an articulated coupling interconnecting each said pivot pin to one end of said torsion bar, each said coupling including a ball portion formed on the inboard end of each said pivot pin, each said ball portion being received in an axially extending socket formed in the outboard end of a spool member, a pair of diametrically opposed apertures in said spool member extending into said socket and aligned on a cross axis which intersects the principal axis of said spool member at a right angle, said spool member having an polygonal cross sectioned axial passage extending between its socket and the inboard end of said spool member, a diametrical slot in said ball portion, pin means extending through said socket aligned apertures and said slot such that with said pin means aligned on said slot principal axis said spool member adapted for limited axial and universal movement of said spool member relative to said ball portion, said motor means operative upon rotating said bar revolving each said spool member and its associated pivot pin thereby causing the right and left closures to be moved between their first and second positions.

2. The articulated coupling as set forth in claim 1, wherein upon said cross pin means being removed from its associated spool member and ball portion said spool member being free to slide inboard on said torsion bar, such that with its associated pivot pin outboard fastener means being disconnected, said pivot pin being readily removed.

3. The articulated coupling as set forth in claim 1, wherein said cross pin means in the form of a spring wire clip having one end releasably engaging the spool member and its other end defining a cross pin retaining the spool socket on the pivot pin ball portion.

4. The articulated coupling as set forth in claim 3, wherein said spring wire clip having a semi-circular loop portion formed at said one end conforming to its cylindrical spool member, said loop portion having its free end adapted to releasably engage its associated spool member, said loop portion having its other end terminating in a straight leg portion extending axially from the plane of said loop portion, said leg portion terminating in a cross pin portion extending at right angles to said leg portion, said cross pin portion adapted to extend through its associated spool aligned apertures and its associated ball portion diametrical slot so as to releasably interconnect its associated ball portion and spool member.

* * * * *